(12) United States Patent
Setono

(10) Patent No.: US 7,710,840 B2
(45) Date of Patent: May 4, 2010

(54) DISK DEVICE

(75) Inventor: Shingo Setono, Osaka (JP)

(73) Assignee: Funai Electric CO., Ltd., Osaka (JP)

( * ) Notice: Subject to any disclaimer, the term of this patent is extended or adjusted under 35 U.S.C. 154(b) by 703 days.

(21) Appl. No.: 11/703,774

(22) Filed: Feb. 8, 2007

(65) Prior Publication Data

US 2007/0183276 A1    Aug. 9, 2007

(30) Foreign Application Priority Data

Feb. 9, 2006    (JP)    ............................ P2006-031969

(51) Int. Cl.
*G11B 15/52*    (2006.01)
(52) U.S. Cl. ............... 369/47.14; 369/47.44; 369/53.15
(58) Field of Classification Search ....................... None
See application file for complete search history.

(56) References Cited

U.S. PATENT DOCUMENTS 4,807,206 A * 2/1989 Moriya et al. ............ 369/44.25
5,150,344 A * 9/1992 Iwase et al. ............... 369/44.28
5,878,184 A * 3/1999 Tajiri ....................... 369/47.18

FOREIGN PATENT DOCUMENTS

JP    A-5-342783    12/1993
JP    A-2001-34961    2/2001

* cited by examiner

*Primary Examiner*—Paul Huber
(74) *Attorney, Agent, or Firm*—Morgan, Lewis & Bockius LLP

(57) ABSTRACT

A disk device includes: an optical pick-up, operable to reproduce data recorded in a disk; a flaw detector, operable to output a flaw detecting signal when a flaw formed on the disk is detected; and a jump controller, operable to control a track jump of the optical pick-up including a first track jump and a second track jump subsequent to the first track jump. A timing of starting to control the track jump corresponding to a still reproduction mode is determined based on a rotational position of the disk. When the flaw detecting signal is outputted in a time period in which the jump controller controls the first track jump corresponding to the still reproduction mode, the jump controller sets a timing for stating the second track jump to a timing different from a timing for starting the first track jump.

3 Claims, 5 Drawing Sheets

DISK DEVICE

CROSS-REFERENCE TO RELATED APPLICATIONS

This application is based upon and claims the benefit of priority from prior Japanese patent application No. 2006-031969, filed on Feb. 9, 2006, the entire contents of which are incorporated herein by reference.

BACKGROUND OF THE INVENTION

The present invention relates to a disk device including a flaw detecting unit for outputting a flaw detecting signal when a flaw formed in a disk is detected, and more particularly to a disk device in which when it is detected that the flaw detecting signal is outputted at the time of controlling a track jump corresponding to a still reproduction, a timing for starting a subsequent track jump is controlled properly.

In a still reproduction mode of video and audio information recorded in a DVD, a track jump toward an inner peripheral side is carried out by one track for each rotation of the DVD to repeatedly reproduce the same position. Further, in the track jump, after a pulse is applied for accelerating and moving a reading position toward the inner peripheral side, a pulse is applied for reducing the moving speed of the reading position and stopping the reading position. Then, when the track jump is completed, a servo control of a tracking is resumed (This technique is referred to as a first related art).

Further, when a DPD (Differential Phase Detection) signal is used as a tracking error signal, if the landing position of the track jump corresponds to a part (a linking part) in which data is written and connected or a part in which since the data is not recorded, a reproducing RF signal is not obtained, the tracking error signal is undesirably disturbed after the track jump lands so that a reproducing operation cannot be preferably carried out from a desired sector. Thus, a below-described technique is proposed.

Namely, in this technique (This technique is referred to as a second related art), when the track jump is started, it is decided whether or not a landing position obtained when the track jump is carried out from the current reading position is a position suitable for landing. That is, whether the landing position is the linking part or the part in which the data is not recorded is examined. Then, when the landing position is the linking part or the part in which the data is not recorded, a timing of starting the track jump is shifted so that the landing position does not correspond to the linking part or the part in which the data is not recorded. Further, in the technique, the part in which the data is not recorded is a sector that is replaced due to a flaw (for instance, see JP-A-2001-34961).

Further, a below-described technique is proposed (This technique is referred to as a third related art). In this technique, when a track jump is carried out, the applying time of a pulse for carrying out the track jump is determined not on the basis of a tracking error signal, but on the basis of a control signal outputted from a deciding circuit. The deciding circuit decides whether a jump is too sufficient or insufficient from the tracking error signal when the pulse is applied for a prescribed time in the track jump of a previous time to generate the control signal showing a proper applying time in accordance with the decided result. Then, when a subsequent track jump is carried out, the applying time of the pulse for the track jump is determined not on the basis of the tracking error signal, but on the basis of the control signal outputted from the deciding circuit. As a result, even when noise is generated in the tracking error signal owing to the flaw of an optical disk, the track jump is carried out without a difficulty (for instance, see JP-A-5-342783).

However, when the first related art is employed, below-described problems arise. That is, when the flaw is present in the landing position, a normal tracking error signal is not obtained. Therefore, a tracking may not be normally resumed after the track jump. Namely, a situation arises that the track jump of an optical pick-up cannot successfully arrive at an adjacent track so that the reading position of the optical pick-up greatly shifts in the radial direction. Then, when the reading position of the optical pick-up greatly shifts in the radial direction, the level of a tracking error signal may oscillate with a large amplitude so that a driving signal oscillating with a large amplitude is applied to a tracking actuator. As a result, an objective lens greatly oscillates in the radial direction. Thus, an abnormal sound such as creak is generated from a disk drive to give a discomfort to a user.

When the second related art is employed, if a replacement process is carried out so that an area having the flaw is not used, the track jump of the optical pick-up can be avoided from landing at a position where the flaw is present. However, even when there is such a flaw as to disturb the tracking error signal at the time of landing, since all the part having the flaw is not necessarily replaced, a situation may possibly arise that the track jump of the optical pick-up lands at the position having the flaw. Further, in the case of the disk exclusive for a reproduction, since the replacement process is not carried out, the technique cannot be applied. Further, since a process for detecting whether or not the landing position is an area that is subjected to the replacement process includes a complication calculation, the structure of software is undesirably complicated.

Since the third related art is the technique for performing the track jump without referring to the tracking error signal, the third related art is hardly applied to solve the problems in the first related art.

SUMMARY

It is therefore an object of the invention to provide a disk device that can preferably prevent a tracking servo from being unstable at the time of landing of a track jump in a structure for carrying out the track jump corresponding to a still reproduction.

In order to achieve the object, according to the invention, there is provided a disk device comprising:

optical pick-up means for reproducing data recorded in a disk;

pulse generating means for outputting an FG pulse every time a spindle motor for rotating the disk rotates by a prescribed angle;

flaw detecting means for outputting a flaw detecting signal when a flaw formed on the disk is detected; and jump control means for controlling a track jump of the optical pick-up means, the jump control means starting to control of the track jump in accordance with a timing of outputting the FG pulse at the time of a still reproduction; wherein when the jump control means detects that the flaw detecting signal is outputted during controlling the tack jump corresponding to the still reproduction, the jump control means sets a different timing for starting a subsequent track jump from the previous timing of starting the track jump, and when the jump control means detects that the flaw detecting signal is outputted at the time of starting to control the track jump corresponding to the still reproduction, the jump control means sets the timing of starting the track jump to a timing delayed by a prescribed amount therefrom.

DETAIL DESCRIPTION OF PREFERRED EMBODIMENTS

Figure 1:
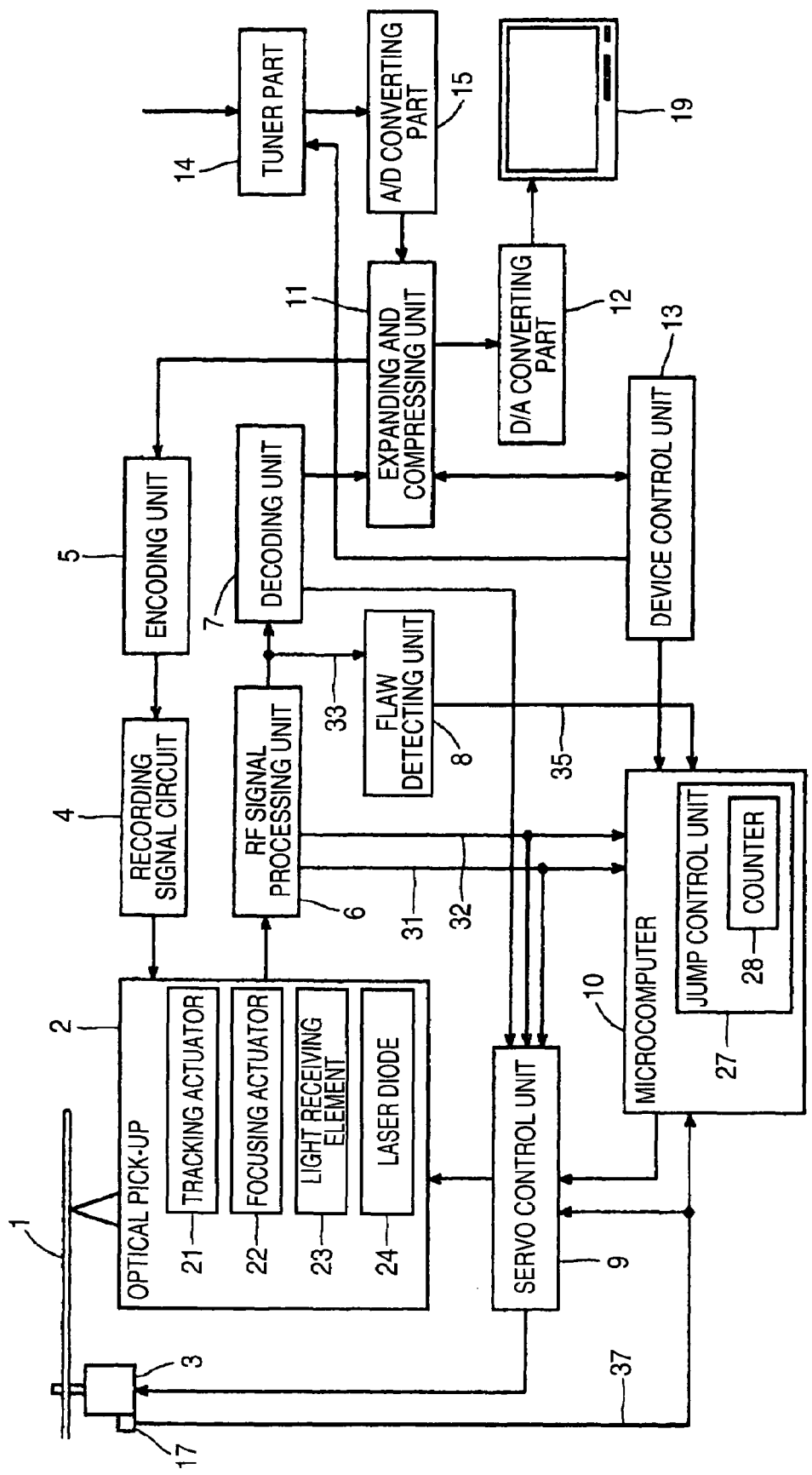
FIG. 1 is a block diagram showing an electric structure of a DVD recorder of one embodiment of a disk device according to the present invention.

Now, an embodiment of the present invention will be described by referring to the drawings.

FIG. 1 is a block diagram showing an electric structure of a DVD recorder as one embodiment of a disk device according to the present invention.

In FIG. 1, a spindle motor 3 rotates and drives a DVD (disk) 1. A pulse generating unit 17 generates an FG pulse 37 every time the spindle motor 3 rotates by a prescribed angle (in this embodiment, the angle is set to 60°, however, other angle may be used) to output the FG pulse to a servo control unit 9 and a microcomputer 10. An optical puck-up 2 is configured to reproduce data recorded on the DVD 1 and to record data on the DVD 1. Accordingly, the optical pick-up 2 includes a tracking actuator 21, a focusing actuator 22, a light receiving element 23 and a laser diode 24.

The tracking actuator 21 moves the focusing position of a laser beam in the radial direction of the DVD 1. The focusing actuator 22 moves the focusing position of the laser beam in the direction of an optical axis of an objective lens (not shown in the drawings). The light receiving element 23 includes an element divided into four light receiving areas of A, B, C and D, an element divided into two light receiving areas of E and F in the direction perpendicular to a track direction and an element divided into two light receiving areas of G and H in the direction perpendicular to the track direction, to detect a reflected light from the DVD 1. The laser diode 24 outputs the laser beam used for reproducing data recorded on the DVD 1 and recording data on the DVD 1.

An RF signal processing unit 6 generates a tracking error signal (refer it to as a TE signal, hereinafter) 31 and a focus error signal (refer it to as an FE signal, hereinafter) 32 to output the signals to the servo control unit 9 and the microcomputer 10. Further, the RF signal processing unit 6 generates a total reflection signal (corresponding to the RF signal when the recording area of the data is reproduced) 33 to output the total reflection signal to a decoding unit 7 and a flaw detecting unit 8.

The decoding unit 7 demodulates the total reflection signal 33 outputted from the RF signal processing unit 6. Then, the decoding unit outputs compressed video and audio information, obtained by performing a decoding process and an error correction to the demodulated digital data, to an expanding and compressing unit 11. An encoding unit 5 outputs the digital data, obtained by encoding the compressed video and audio information that is outputted from the expanding and compressing unit 11, to a recording signal circuit 4. The recording signal circuit 4 generates a recording signal from the digital data outputted from the encoding unit 5. Then, the laser diode 24 is driven by the generated signal to record the video and audio information on the DVD 1.

The flaw detecting unit 8 detects whether or not a flaw is formed on the DVD 1 in accordance with a peak level of the total reflection signal 33. Then, when the flaw detecting unit detects the flaw, the flaw detecting unit generates a flaw detecting signal 35 and outputs the flaw detecting signal to the microcomputer 10. The servo control unit 9 drives the tracking actuator 21 and the focusing actuator 22 on the basis of the TE signal 31 and the FE signal 32 to servo control the reading position of the optical pick-up 2 so as to follow a track formed on the DVD 1. Further, the servo control unit 9 refers to a clock signal outputted from the decoding unit 7 to servo control the rotation of the spindle motor 3 (during a CLV). Further, the servo control unit 9 servo controls the rotation of the spindle motor 3 on the basis of the FG pulse 37 (during a CAV).

The microcomputer 10 controls a main operation as a front end. That is, the microcomputer 10 controls the start or the stop of the rotation of the spindle motor 3 through the servo control unit 9. Further, the microcomputer controls the servo control of tracking or focusing to be started and stopped. Further, when the servo control of tracking is carried out, if the flaw detecting signal is outputted from the flaw detecting unit 8, the microcomputer maintains the holding state of tracking, and if the output of the flaw detecting signal 35 is stopped, the microcomputer resumes the servo control of the tracking. Further, the microcomputer includes a jump control unit 27 by a part of the function thereof.

The jump control unit 27 controls a track jump through the servo control unit 9. Namely, when an instruction for jumping a plurality of tracks is outputted from a device control unit 13, the jump control unit 27 carries out a control for jumping the plurality of tracks as instructed through the servo control unit 9.

When the instruction from the device control unit 13 indicates a track jump for a still reproduction (still reproduction mode), the jump control unit 27 applies a pulse for jumping to the tracking actuator 21 for each rotation of the DVD 1 (every time six FG pulses are outputted) to control the tracking actuator to jump to a track nearer by one track to an inner peripheral side so that the reading position of the optical pick-up 2 is located at the same position in the radial direction. Further, when the jump control unit detects that the flaw detecting signal 35 is outputted during controlling the track jump for the still reproduction, the jump control unit sets a timing of starting a subsequent track jump to a timing different from the previous timing.

Further, when the jump control unit starts to control the track jump, if the jump control unit detects that the flaw detecting signal 35 is outputted, the jump control unit sets the timing of starting the track jump to a timing delayed by a prescribed amount from the previous timing (a timing delayed by a period equal to an output interval of the FG pulse 37). A counter 28 will be described below.

A tuner part 14 receives a commercial broadcasting of a channel instructed from the device control unit 13 and outputs an analog video signal (including an analog audio signal) obtained by receiving the broadcasting to an A/D converting part 15. The A/D converting part 15 converts the analog video signal outputted from the tuner part 14 to a digital video signal (including a digital audio signal) and outputs the digital video signal to the expanding and compressing unit 11. A D/A converting part 12 converts the digital video signal (including the digital audio signal) outputted from the expanding and compressing unit 11 to an analog video signal (including an analog audio signal) and outputs the analog video signal to a television receiver 19 provided in an external part.

The expanding and compressing unit 11 compresses the digital video signal outputted from the A/D converting part 15 in accordance with MPEG2 (as for the audio signal, AC3 or the like). Then, the expanding and compressing unit outputs compressed video and audio information obtained by a compressing process to the encoding unit 5. Further, the expanding and compressing unit 11 expands compressed video and audio information outputted from the decoding unit 7 in accordance with MPEG2 (as for the audio signal, AC3 or the like). Then, the expanding and compressing unit 11 outputs the digital video signal obtained by an expanding process to the D/A converting part 12.

The device control unit 13 is constructed by including the microcomputer as a main part to control a main operation as the DVD recorder. That is, in accordance with an instruction of a user inputted to a remote controller (not shown in drawings), the channel received by the tuner part 14 is controlled. Further, the instruction is supplied to the microcomputer 10 and the operation of the expanding and compressing unit 11 is controlled to record a program received by the tuner part 14 on the DVD 1. Further, the program recorded on the DVD 1 is reproduced and displayed on the television receiver 19.

Figure 2:
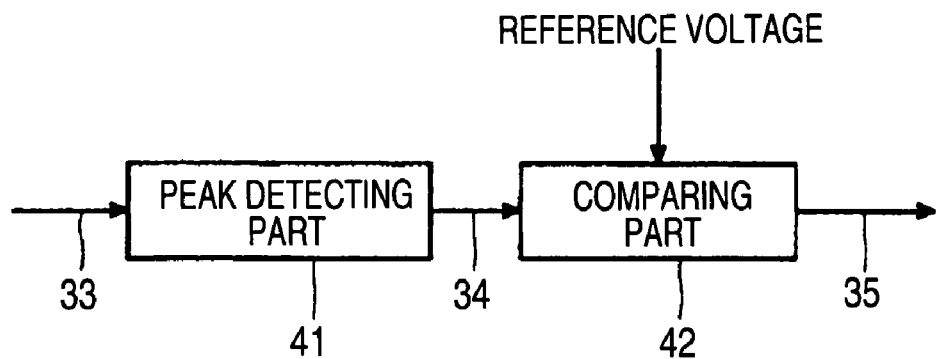
FIG. 2 is a block diagram showing an electric structure of a flaw detecting unit.
Figure 3:
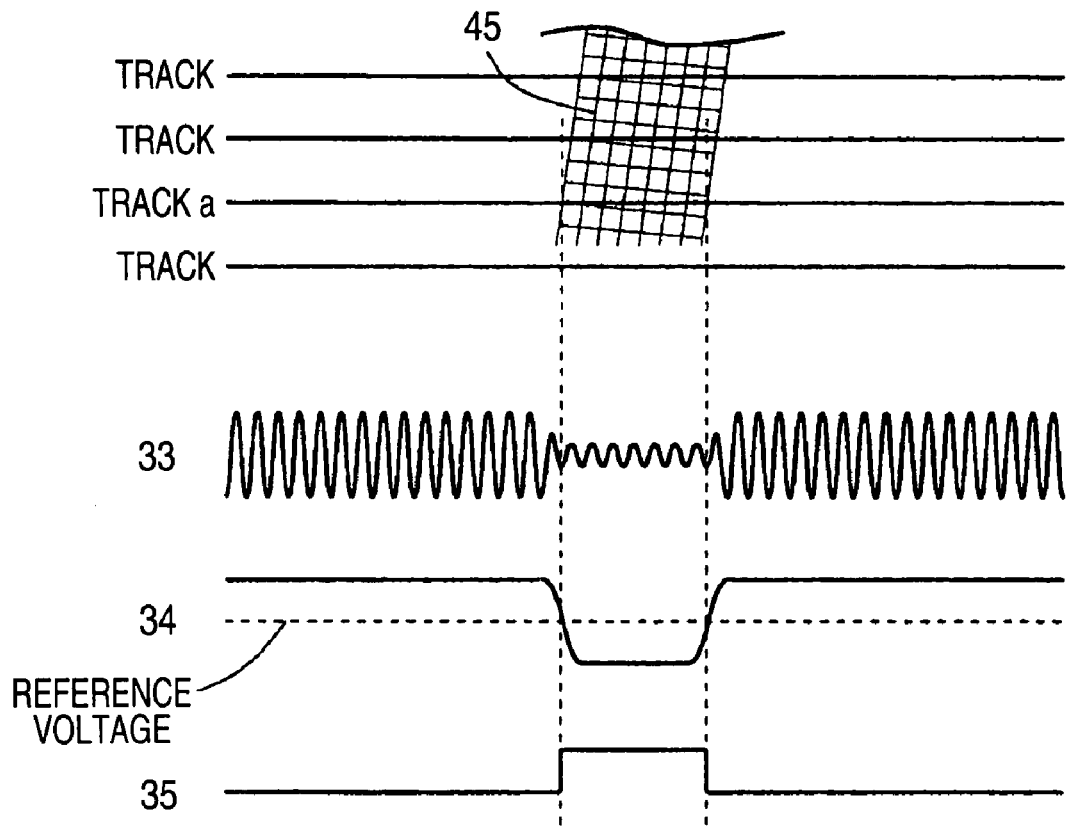
FIG. 3 is an explanatory view showing a signal wave form related to the flaw detecting unit.

FIG. 2 is a block diagram showing a detailed electric structure of the flaw detecting unit 8. FIG. 3 is an explanatory view showing a signal wave form related to the flaw detecting unit 8. Referring to FIG. 2, the structure of the flaw detecting unit 8 will be described.

The flaw detecting unit 8 includes a peak detecting part 41 and a comparing part 42. The peak detecting part 41 detects the peak level of the total reflection signal (the RF signal) 33. The comparing part 42 compares the output 34 of the peak detecting part 41 with a reference voltage. When the level of the output 34 is lower than the reference voltage, the comparing part outputs the flaw detecting signal (H level) to an output 35.

Now, it is assumed that the reading position of the optical pick-up 2 moves along a track a. Then, when the reading position enters the range of a flaw 45, the amplitude of the total reflection signal 33 is decreased to lower the peak level. As a result, since the level of the output 34 of the peak detecting part 41 is lowered, the H level as the flaw detecting signal is supplied to the output 35. The flaw detecting unit 8 may be included in a part of the function of the microcomputer 10.

Figure 4:
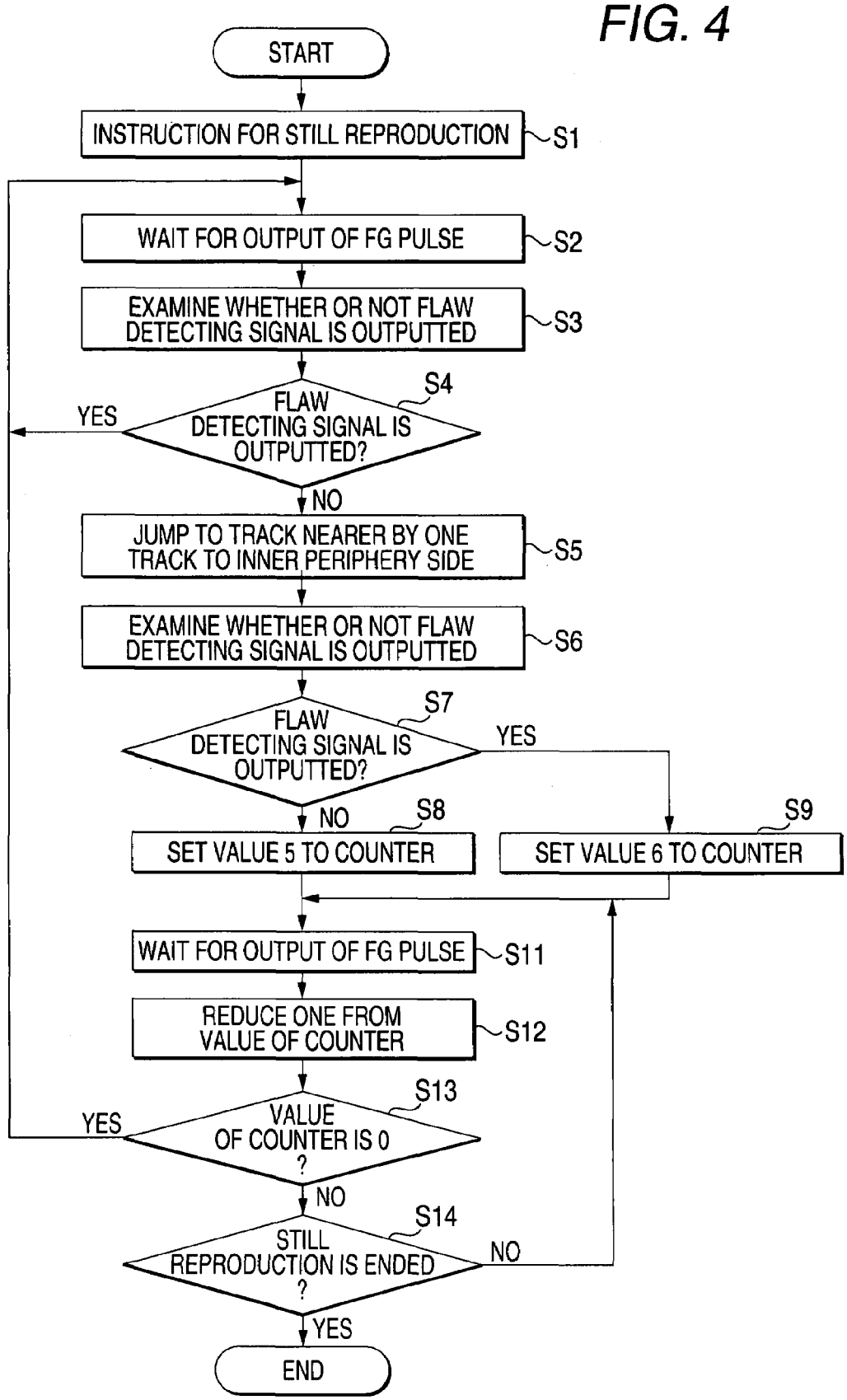
FIG. 4 is a flowchart showing an operation of the embodiment during a track jump.
Figure 5:
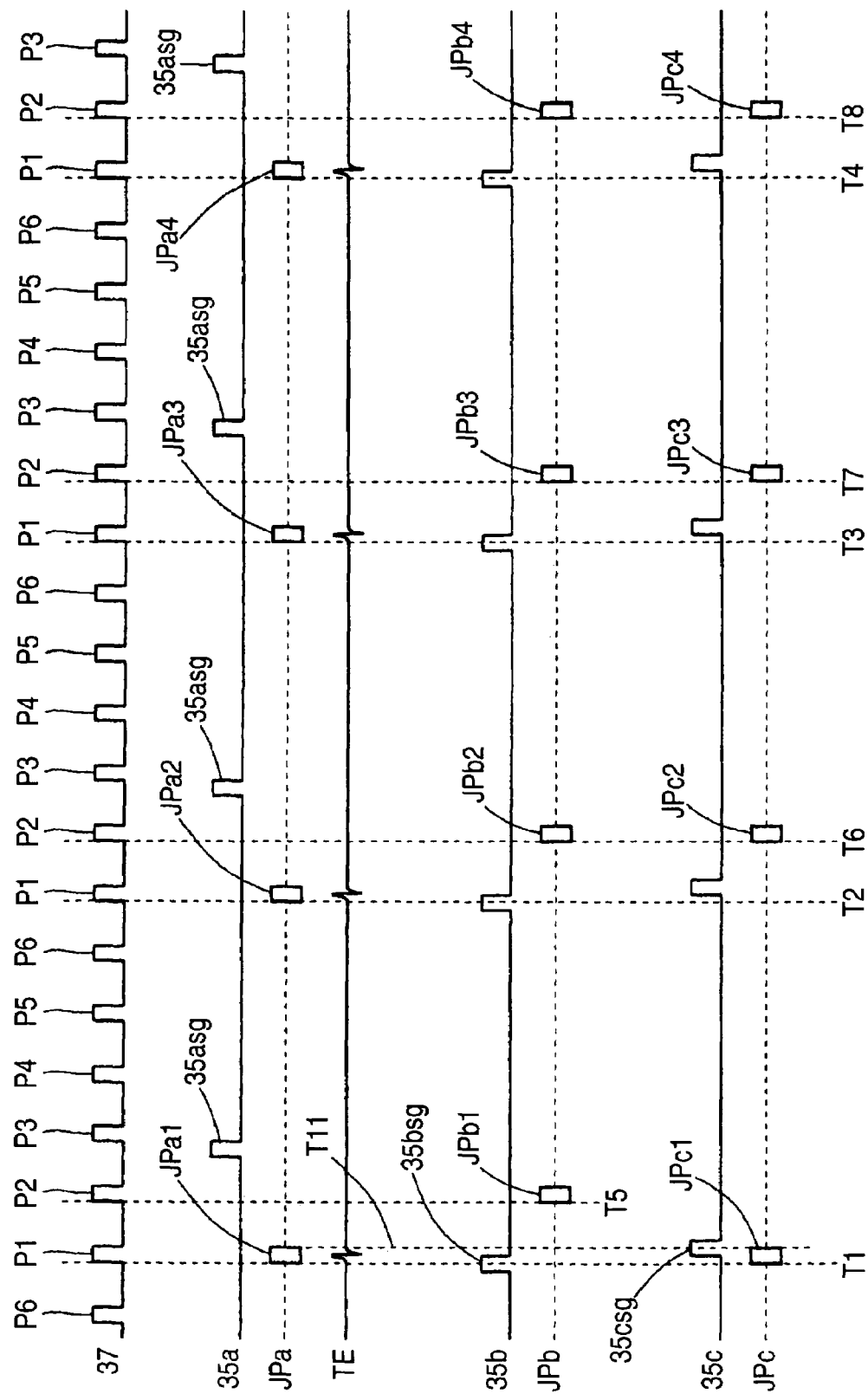
FIG. 5 is an explanatory view showing the relation in time between an FG pulse, the track jump and a flaw detecting signal.
Figure 6:
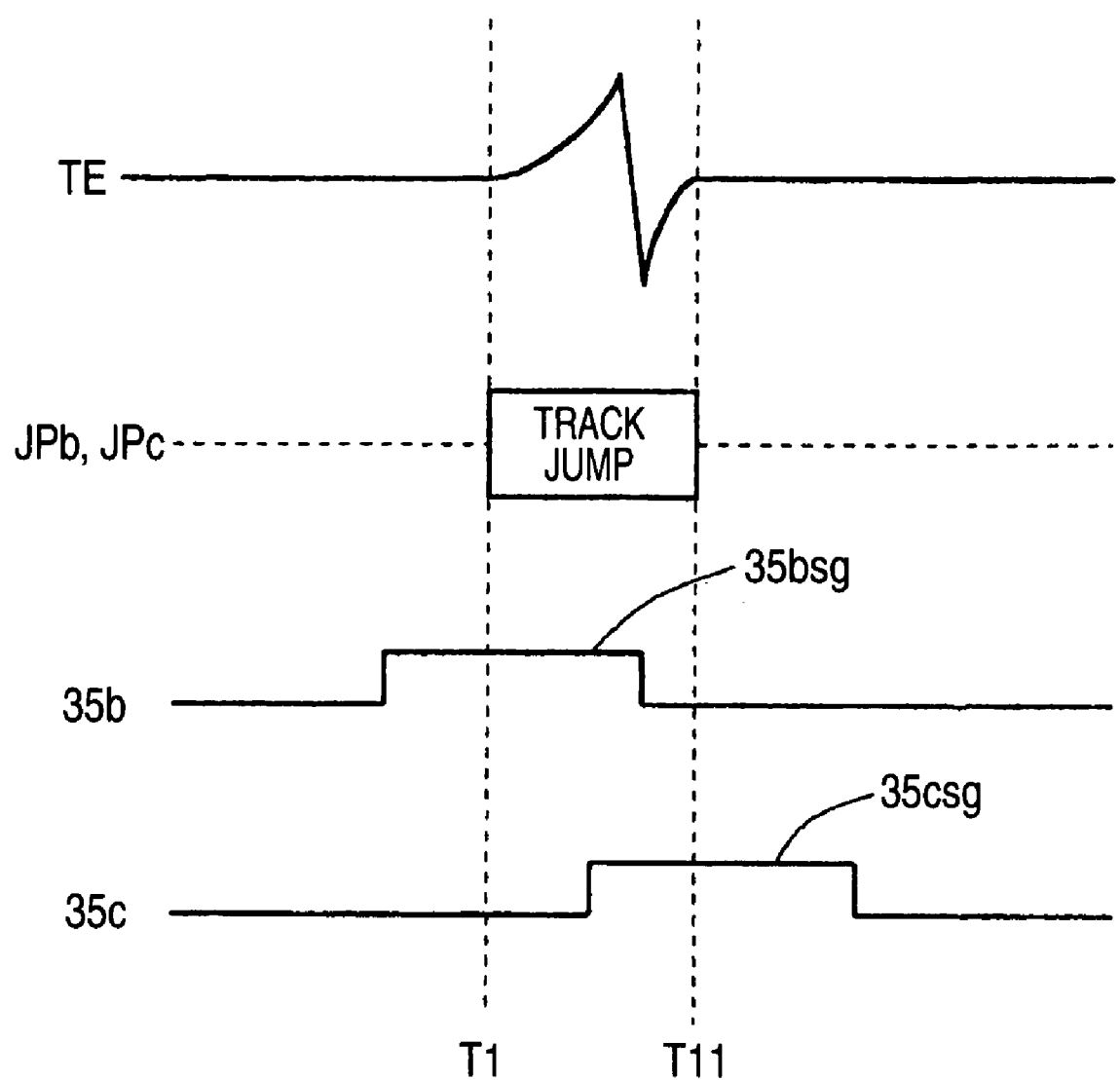
FIG. 6 is an explanatory view showing the relation between the timing of the track jump and the timing of outputting the flaw detecting signal.

FIG. 4 is a flowchart showing the operation of the embodiment during the track jump. FIG. 5 is an explanatory view showing the relation in time between the FG pulses, the track jumps and the flaw detecting signals. 35a to 35c show timing of outputting the flaw detecting signals. JPa to JPc show timing of the track jumps. FIG. 6 is an explanatory view showing the detailed relation between the timing of the track jumps and the timing of outputting the flaw detecting signals. The operation of this embodiment will be described by referring to the drawings as required.

When an instruction for the still reproduction is inputted (step S1), the jump control unit 27 waits for the FG pulse to be outputted to the output 37 from the pulse generating unit 17 (step S2). When the FG pulse is outputted to the output 37 (time T1), the jump control unit decides the time to be a starting time for controlling the track jump and examines whether or not the flaw detecting signal is outputted to the output 35 from the flaw detecting unit 8 (step S3). When the flaw detecting signal is not outputted, the jump control unit controls the track jump to jump to a track nearer by one track to the inner peripheral side (step S4, step S5).

When the control of the track jump is completed, the jump control unit examines whether or not the flaw detecting signal is outputted in the output 35 of the flaw detecting unit 8 (step S6). When the flaw detecting signal is not outputted, the jump control unit 27 sets a value 5 to the counter 28 (step S7, step S8). Then, the jump control unit waits for the FG pulse to be outputted to the output 37 (step S1. When the FG pulse 37 is outputted, the jump control unit 27 reduces one from the value of the counter 28 (step S12), and then, examines whether or not the value of the counter is 0.

When the value of the counter 28 is not 0, the jump control unit examines whether or not there is an instruction for completing the still reproduction. When there is no instruction for completing the still reproduction, the jump control unit shifts the operation to the step S11. Accordingly, if the instruction for completing the still reproduction is not subsequently outputted, a loop operation of the step S11 to the step S14 is performed. Then, when the value of the counter 28 is 0, the operation from the step S2 is resumed.

The above-described operation represents the operation when the flaw detecting signal is not outputted at the time of controlling the track jump corresponding to the still reproduction. Namely, as shown in the relation between 35a and JPa in FIG. 5, at a time T1 when the FG pulse 35 is outputted, the track jump JPa1 is carried out, however, the flaw detecting signal is not detected both at the starting time T1 and the completing time T11 of the track jump JPa1. The flaw detecting signal 35asg is outputted when the track jump JPa1 is not carried out.

At this time, after the track jump JPa1 is carried out (the step S5), the value 5 is set to the counter 28 (the step S8). Then, after that, every time the FG pulse is outputted, the value of the counter 28 is reduced by one (the step S12). Accordingly, when the FG pulse P6 is outputted, the value of the counter 28 is 0, so that the operation shifts to the step S2. Thus, when the FG pulse P1 is outputted again (time T2), the track jump JPa2 is carried out. Then, after that, every time the FG pulse P1 is outputted (time T3, T4, . . . ), the track jump JPa 3, JPa4 . . . are carried out.

On the other hand, as shown in the relation between 35b and JPb, when the flaw detecting signal 35bsg is outputted (it is detected that the flaw detecting signal is outputted) at the time T1 for starting the control of the track jump (see also FIG. 5), the operation advances to the steps S1 to S4, and then shifts to the step S2 to wait for the FG pulse P2 to be outputted. Then, when the FG pulse P2 is outputted (time T5), whether or not the flaw detecting signal is outputted to the output 35 is examined again (the step S3). At this time, since the flaw detecting signal is not outputted, the track jump JPb1 is carried out (the steps S4, S5).

Namely, the track jump is carried out at the timing (time T5) delayed by 60° in terms of the rotating angle of the DVD 1 from the previous timing (time T1). Then, the operation the same as the already explained operation is subsequently carried out. Therefore, after that, every time the FG pulse P2 is outputted (the times T6 to T8, . . . ), the track jumps JPb2 to JPb4, . . . are carried out. In other words, the track jump is carried out so that the jump can arrive at a position having no flaw.

Further, as shown in the relation between 35c and JPc, the flaw detecting signal is not outputted at the time of starting the control of the track jump (time T1), however, when the control of the track jump is completed (time T11), the flaw detecting signal 35csg is outputted (it is detected that the flaw detecting signal is outputted) (see also FIG. 5), the operation advances to the step S5 from the steps S1 to S4. Accordingly, at the time T1, the track jump JPc1 is carried out. Then, the operation advances to the steps S6 and S7 and shifts to step S9. Thus, a value 6 is set to the counter 28. After that, the loop operation including the steps S11 to S14 is started.

In the above-described operation, after the track jump JPc1 is carried out (the step S5), the value 6 is set to the counter 28 (the step S9). Then, subsequently, every time the FG pulse is outputted, the value of the counter 28 is reduced by one. Accordingly, at the time T2, when the FG pulse P1 is outputted, the value of the counter 28 is 0, so that the operation shifts to the step S2 from the step S13. As a result, at the time T6, when the FG pulse P2 is outputted, the track jump JPc2 is carried out. Then, after that, every time the FG pulse P2 is outputted (time T7, T8, . . . ), the track jumps JPc3, JPc4, . . . are carried out.

That is, when the track jump JPc1 is controlled, if it is detected that the flaw detecting signal 35csg is outputted, the timing of starting the subsequent track jump is changed to a timing (at the time of outputting the FG pulse P2) different from the previous timing of starting the track jump (at the time of outputting the FG pulse P1). Namely, the track jump is carried out so that the track jump can land at a position having no flaw.

The present invention is not limited to the above-described embodiment. In the above-described structure of the FG pulse, the FG pulse is outputted every time the DVD 1 rotates by 60° (the six FG pulses are outputted for each rotation of the DVD 1). However, the present invention may be similarly applied to a structure in which the FG pulse is outputted every time the DVD is rotated by other angle (for instance, 30° or 45°, etc.).

Further, as the disk, the use of the DVD is described, however, the present invention may be also applied to other disk on which a spiral track is formed (for instance, an optical disk such as an HD-DVD or a blue ray disk or a photo-electro magnetic disk).

Further, as described above, the present invention is applied to the DVD recorder. However, the present invention may be also applied to a hard disk drive integrated type DVD recorder or a DVD player.

A target position of the track jump in the still reproduction is a position extremely near to the start position of the track jump. Accordingly, when the track jump is carried out at a position where the flaw exists (when it is detected that the flaw detecting signal is outputted during controlling the track jump corresponding to the still reproduction), there is a very high possibility that the flaw is present in the landing position. According to an aspect of the present invention, the timing of starting the subsequent track jump is different from the previous timing of starting the track jump. Accordingly, since the subsequent track jump is carried out at a position different from the position of the current track jump, the landing position is also different from the landing position of the current track jump. Thus, the subsequent landing position is a position having no flaw with an extremely high probability. Further, when the starting position of the track jump is a position having the flaw, an extremely high possibility is expected that the flaw exists in the landing position. Accordingly, at this time, the timing of starting the track jump is delayed and the track jump is started at a position having no flaw. As a result, the landing position of the track jump is a position having no flaw with an extremely high probability. Therefore, in the structure for carrying out the track jump corresponding to the still reproduction, a tracking servo can be preferably prevented from being unstable at the time of landing in the track jump with high probability. Further, the still reproduction on the disk having the flaw can be stabilized and the generation of an abnormal sound due to the failure of the track jump in the still reproduction can be prevented.

What is claimed is:

1. A disk device comprising:
   optical pick-up means for reproducing data recorded in a disk;
   pulse generating means for outputting an FG pulse every time a spindle motor for rotating the disk rotates by a prescribed angle;
   flaw detecting means for outputting a flaw detecting signal when a flaw formed on the disk is detected; and
   jump control means for controlling a track jump of the optical pick-up means, the jump control means starting control of the track jump in accordance with a timing of outputting the FG pulse at the time of a still reproduction; wherein
   when the jump control means detects that the flaw detecting signal is outputted during controlling the track jump corresponding to the still reproduction, the jump control means sets a different timing for starting a subsequent track jump from the previous timing of starting the track jump, and
   when the jump control means detects that the flaw detecting signal is outputted at the time of starting to control the track jump corresponding to the still reproduction, the jump control means sets the timing of starting the track jump to a timing delayed by a prescribed amount therefrom.

2. A disk device comprising:
   an optical pick-up, operable to reproduce data recorded in a disk;
   a flaw detector, operable to output a flaw detecting signal when a flaw formed on the disk is detected; and
   a jump controller, operable to control a track jump of the optical pick-up including a first track jump and a second track jump subsequent to the first track jump, wherein
   a timing of starting to control the track jump corresponding to a still reproduction mode is determined based on a rotational position of the disk, and
   when the flaw detecting signal is outputted in a time period in which the jump controller controls the first track jump corresponding to the still reproduction mode, the jump controller sets a timing for starting the second track jump to a timing different from a timing for starting the first track jump.

3. The disk device according to claim 2, wherein when the flaw detecting signal is outputted at a time point at which the jump controller starts to control the track jump corresponding to the still reproduction mode, the jump controller sets a timing for starting the track jump to a timing delayed by a prescribed amount therefrom.

* * * * *